United States Patent [19]

Ogata et al.

[11] Patent Number: 4,466,701
[45] Date of Patent: Aug. 21, 1984

[54] HIGHLY RELIABLE ELECTROOPTICAL DEVICE AND PROCESS FOR MANUFACTURING THE SAME

[75] Inventors: Satoshi Ogata, Miyoshi; Hideyuki Fujimoto, Syobara, both of Japan

[73] Assignee: Optrex Corporation, Tokyo, Japan

[21] Appl. No.: 397,214

[22] Filed: Jul. 12, 1982

[30] Foreign Application Priority Data

Aug. 25, 1981 [JP] Japan ................. 56-132060

[51] Int. Cl.$^3$ ................................. G02F 1/13
[52] U.S. Cl. ........................ 350/336; 350/343
[58] Field of Search ............ 350/336, 343, 344, 339 R

[56] References Cited

U.S. PATENT DOCUMENTS 4,193,669 3/1980 Richardson ............... 350/336 X
4,243,455 1/1981 Shiba et al. ............... 350/336 X
4,297,004 10/1981 Nishimura et al. ........ 350/339 R X

FOREIGN PATENT DOCUMENTS 54-25464 2/1979 Japan ................. 350/336
55-6232 2/1980 Japan ................. 350/336
55-35326 3/1980 Japan ................. 350/336
59-5037 1/1984 Japan .

Primary Examiner—John K. Corbin
Assistant Examiner—Richard F. Gallivan
Attorney, Agent, or Firm—Oblon, Fisher, Spivak, McClelland & Maier

[57] ABSTRACT

A highly reliable electrooptical device comprises a pair of electrode plates facing each other with a space and sealed along their periphery by a sealing material to form a cell and an electrooptical material sealed in the cell. The device is characterized in that a protective layer of an electrically conductive material comprising electrically conductive particles and a binder is coated on each lead terminal extending outside the sealing material and the protective layer is partially embedded in the sealing material.

8 Claims, 5 Drawing Figures

HIGHLY RELIABLE ELECTROOPTICAL DEVICE AND PROCESS FOR MANUFACTURING THE SAME

BACKGROUND OF THE INVENTION

1. Field of the Invention

The present invention relates to a highly reliable electrooptical device and a process for manufacturing the same, and more particularly to an electrooptical device wherein the reliability of the lead terminals have been improved.

2. Description of the Prior Art

Various electrooptical devices such as liquid crystal display devices, electrochromic display devices and electrophoretic display devices, and they are used alone or in a combination of a plurality of units, as a display device or as an optical shutter.

These electrooptical devices comprise a pair of electrode plates facing each other with a space and sealed along their periphery by a sealing material to form a cell and an electrooptical material sealed in the cell. When subjected to a reliability test such as a high temperature test or a high temperature and high humidity test, the sealed assembly is not substantially affected, but lead terminals of exposed transparent electrodes are likely to be adversely affected especially when operated under a high temperature and high humidity condition. The lead terminals are susceptible to corrosion and likely to lead to defective connection to an external circuit. In the case of watches or electric culculators, it is rare that they are subjected to such a high temperature and high humidity condition. However, in the case of instrument panels or meters for automobiles and measuring devices, it is likely that they are subjected to such a severe condition, and they are desired to have adequate durability.

In order to prevent such adverse effects, it has been proposed to form a protective layer of an electrically conductive material on the lead terminals. When such a protective layer is applied subsequent to sealing, it is difficult to form the protective layer on the lead terminals especially in the vicinity of the boudaries with the sealing material. It is likely that an unprotected portion is left along such a boundary, and such a portion is very much susceptible to corrosion since water drops, etc. are likely to deposit on the portion. In the case of a protective layer formed by vapour deposition of a metal, if tiny pin holes or unprotected portions are left, such portions are very much susceptible to corrosion, and thus, no adequate protection has been obtained by such vapour deposition of a metal.

SUMMARY OF THE INVENTION

It is an object of the present invention to provide a highly reliable electrooptical device and particularly to provide an electrooptical device whereby the lead terminals are hardly corroded even when the device is operated under a high temperature and high humidity condition and thus free from degradation of the electrical connection.

Another object of the present invention is to provide a process for manufacturing the highly reliable electrooptical device with a high productivity, and without involving intricate steps or elaborate operations.

Thus, the present invention provides a highly reliable electrooptical device comprising a pair of electrode plates facing each other with a space and sealed along their periphery by a sealing material to form a cell and an electrooptical material sealed in the cell. The device is characterized in that a protective layer of an electrically conductive material comprising electrically conductive particles and a binder is coated on each lead terminal extending outside the sealing material and the protective layer is partially embedded in the sealing material.

The present invention further provides a process for manufacturing a highly reliable electrooptical device comprising:

(a) a step of printing an electrically conductive paste comprising electrically conductive particles and a binder on a lead terminal of one of a pair of base plates with an electrode and the lead terminal, (b) a step of printing a sealing material on a predetermined position of the other base plate with an electrode, (c) a step of assemblying and pressing the two base plates to form a cell, and (d) a step of sealing an electrooptical material in a cell gap, wherein the electrically conductive paste and the sealing material are printed in a relative positional relationship such that when the cell is formed, the electrically conductive paste is partially embedded in the sealing material.

DETAILED DESCRIPTION OF THE PREFERRED EMBODIMENTS

The electrooptical devices of the present invention include liquid crystal display devices, electrochromic display devices or electrophoretic display devices, which comprise a pair of electrode plates facing each other with a space and sealed along their periphery by a sealing material to form a cell and an electrooptical material sealed in the cell, and they may be used alone or in combination.

Among them, the liquid crystal display device is most commonly used, and the invention will be described with respect to the liquid crystal display device as a representative of the electrooptical device.

Figure 1:
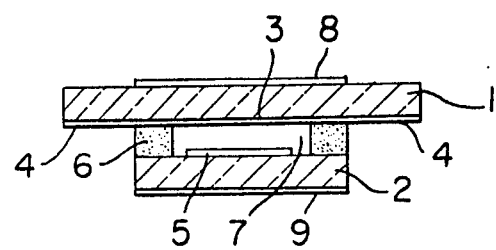
FIGS. 1 and 2 are cross sectional views of typical prior art liquid crystal display devices.
Figure 2:
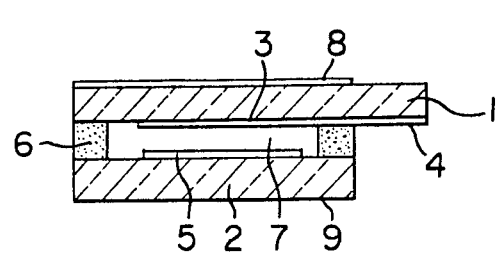

FIGS. 1 and 2 are cross sectional views of typical conventional liquid crystal display devices. In the Figures, reference numeral 1 designates a front base plate and numeral 2 is a back base plate. On the inner side of the front base plate 1, there are formed a display electrode 3 of indium oxide and/or tin oxide and a lead terminal 4 for connection to an external circuit. On the inner side of the back base plate 2, there is formed an counter electrode 5. Such a pair of base plates are spaced from each other in a predetermined distance and sealed along their periphery by a sealing material 6, and a liquid crystal 7 is sealed in. In a twisted nematic display device, polarizers 8 and 9 are provided on the front side of the front base plate 1 and the back side of the back base plate 2, respectively. When such a liquid display device is used for e.g. an automobile where high reliability is required, there is a problem that the lead terminal located outside of the sealing material 6 is susceptible to corrosion.

FIG. 1 illustrates a case where lead terminals extend at both ends, and FIG. 2 illustrates a case where a lead terminal extends at one end. In these illustrated cases, the sealing material 6 has its outer periphery being flush with the outer periphery of the base plate 2. However, the sealing material 6 may be bulged out when pressed for hardening it.

Figure 3:
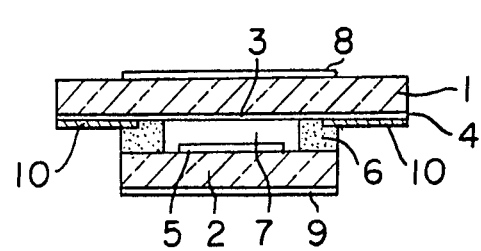
FIG. 3 is a cross sectional view of a liquid crystal display device of this invention.

FIG. 3 is a cross sectional view of a liquid crystal display device according to the present invention and illustrates a case where lead terminals extend at both ends as in the case of FIG. 1.

Referring to FIG. 3, a protective layer 10 of an electrically conductive material comprising electrically conductive particles and a binder is formed on the lead terminals 4 of the front base plate 1, and this protective layer is provided on the lead terminals 4 so that it is partially embedded in the sealing member 6. Having thus partially embedding the protective layer in the sealing material, the portions of the lead terminals in the vicinity of the sealing boundaries where water drops are likely to deposit or moisture is likely to penetrate, are completely covered by the protective layer, and thus the corrosion can thereby be prevented.

In the present invention, the electrode plates are made of a base plate of e.g. glass or a plastic on which an electrode is formed in a desired pattern. Usually both electrode plates are made of a transparent base plate formed with a transparent electrode. However, it is possible to use an opaque base plate such as an active matrix base plate formed with an element such as a transistor, a varistor or a thin film transistor and a back base plate formed with a reflective electrode.

Further, in order to obtain a desired orientation, these electrode plates are provided with an additional layer by obliquely vapour depositing an inorganic substance such as $SiO_2$ or forming an overcoat layer of an inorganic substance or an organic substance such as polyimide polysiloxane or polyamide, followed by rubbing, and/or by applying a homeotropic orientation agent such as silane.

In most cases, the electrode and the lead terminal of the electrode plate are simultaneously formed. It is usual to make a transparent electrode of e.g. indium oxide or/and tin oxide. In order to obtain good transparency, the electrode is formed thinly and consequently, the lead terminal becomes likewise thin.

In the present invention, a protective layer is formed on the lead terminal so that it is partially embedded in the sealing material.

If such a protective layer is not present, water drops are likely to form on the lead terminal and on the surface of the sealing material under a high humidity condition, and the water drops thus formed tent to corrode the lead terminal. Especially in the vicinity of the sealing boundary, water drops are likely to penetrate into a clearance between the base plate and the sealing material, and corrosion is likely to occur especially at such a portion.

When a protective layer is formed subsequent to sealing, it is difficult to form the protective layer in the vicinity of the sealing boundary, and it is usual that an unprotected portion with a width of about 1 mm will be left without the protective layer. Such an unprotected portion is particularly susceptible to corrosion since water drops are most likely to deposit on the portion as mentioned above.

The protective layer of the present invention is made of an electrically conductive material composed of a mixture comprising electrically conductive particles and a binder. It is thereby possible to readily form a relatively thick protective layer.

As the electrically conductive particles, there may be used particles of carbon, gold, silver, copper, chromium, nickel, titanium and so forth. They are mixed in an amount of from 10 to 90%. The particles may not necessarily be spherical but they may be, for instance, in a form of fibers.

As the binder, there may be used a variety of binders such as an epoxy resin, a silicone resin, or a phenol resin. It is optionally selected depending upon the nature of the sealing material and the nature of the electrooptical material, and it is mixed in an amount of from 90 to 10%.

In the electrically conductive material, there may be incorporated, in addition to the above mentioned two components, various additives such as an additive to improve the printability, an additive to control the initiation timing for hardening, and an additive to improve the adhesion to the sealing material. Further, a suitable solvent may be added.

According to the present invention, with use of such an electrically conductive material, a protective layer can more readily be formed with a greater thickness as compared with vapour deposition of gold or chromium, and accordingly, it is free from pin holes or scars which tend to lead to local corrosion.

It is particularly preferred to use carbon particles as the electrically conductive particles of the present invention. They are corrosion resistant by their nature whereby corrosion can hardly be formed.

The particle size of the electrically conductive particles must be smaller than the gap between the base plates of the electrooptical device and must usually be at most a few microns. The electrically conductive material is coated on the lead terminal usually in a thickness of from 2 to 50$\mu$. However, in a case where a plurality of devices are simultaneously formed, this thickness should preferably be thiner than the gap between the base plates.

The electrically conductive material is usually applied by a printing method. Screen printing is most preferred because of the simplicity of the operation. For instance, it is possible to form a layer of the conductive material of a thickness of from 2 to 15$\mu$ with use of a 400 mesh screen or from 8 to 25$\mu$ with use of a 325 mesh screen.

The base plate thus coated with an electrically conductive material is combined with other base plate printed with a sealing material so that the respective electrode sides faces each other, and they are pressed to form a cell.

In a case where lead terminals are provided on both base plates, an electrically conductive material is applied to each lead terminal, and a sealing material is applied to the peripheral portions where no lead terminal is provided, and then the base plates are assembled with the respective electrode sides being face to face.

Recently, in most cases, a lead terminal is provided on only one of the base plates for simplicity of connection. In such a case, the electrically conductive material is applied to the only one base plate by e.g. printing, and the sealing material is applied to the other base plate by e.g. printing, and the base plates are then assembled and pressed to form a cell, as mentioned above.

As the sealing material, there may be used an inorganic substance such as glass frit, or an organic substance such as an epoxy resin, a phenol resin, a silicone resin, an acryl resin or an amide resin, which is capable of being bonded to the base plates. If necessary, a spacer material such as fine fragments of glass fiber or alumina particles may be incorporated to maintain the cell gap to be constant. The sealing material is applied to predetermined locations in a predetermined thickness by e.g. a printing or line drawing method. Further, parts of the sealing material may be made of an electrically conductive material so as to establish an electro-conductive transfer between the base plates. A printing method is advantageously used also for the application of the sealing material for the efficiency of the application.

According to the present invention, the two base plates may be assembled for sealing after the electrically conductive material on the lead terminal has been completely hardened. However, in such a case, adhesion of the sealing material to the electrically conductive material tends to be inadequate. In order to ensure adequate adhesion of the sealing material to the conductive material and to obtain a desired gap upon pressing the assembled base plates, it is preferred to assemble the two base plates before the conductive material has been completely hardened.

Specifically, the electrically conductive material is printed on the lead terminal and hardened to some extent by e.g. heating, and on the other hand, a sealing material is printed on the other base plate and hardened to some extent, and then the two base plates are assembled face to face and pressed. At the time of pressing, heat is applied to complete the hardening if a thermosetting type binder or sealing material is used, or a ultraviolet ray is applied to complete the hardening if a ultraviolet ray hardening type binder or sealing agent is used.

Into the cell thus prepared, a liquid crystal is injected, and then, the injection inlet is sealed by a resin or glass solder to complete the preparation of a liquid crystal display device. Further, if desirable, a polarizer, a color filter, an ultra violet absorbing filter, a reflection plate, a photoconductive plate or a light source may be laminated on this cell. Characters or figures may be printed thereon, and glare-reducing treatment may be applied thereto. Further, the cell may be made in a form of a double layer cell.

In the foregoing, the present invention has been described with reference to a liquid crystal display device. However, the present invention is not limited to such a specific cell, and may be applied to e.g. an electrochromic display device wherein an electrochromic solution such as viologen is injected to the space between the electrode plates, or an electrochromic substance layer such as $WO_3$ or $Ir_2O_3$ is formed on the electrode plates and an electrolyte comprising lithum perchlorate dissolved in propylene carbonate is injected, or a lamination is made via a solid electrolyte such as an iodine compound.

Now, referring to FIGS. 4 and 5, the present invention will be described as applied to the preparation of a set of liquid crystal display devices.

For the production of liquid crystal display devices, it has been common in recent years to produce a plurality of devices, e.g. from 10 to 40 devices, at once by forming cell patterns on large base plates, then assemblying the base plates to form cells and thereafter cutting out the individual cells from the assembly. In an exceptional case where the cells have large surface areas such as an instrument panel for an automobile, only one or two devices may be prepared at one time. However, in most cases, it is usual that a substantial number of devices are produced at one time.

Figure 4:
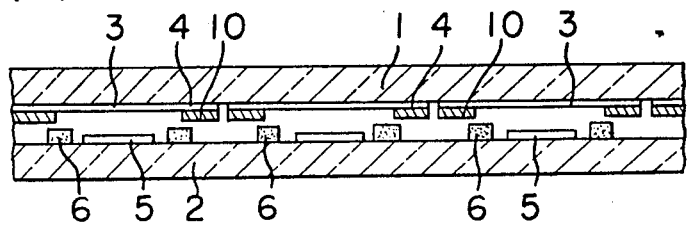
FIGS. 4 and 5 are cross sectional views of sets of liquid crystal display devices of the present invention during their manufacturing.

FIG. 4 is a cross sectional view illustrating the state of liquid crystal display devices immediately prior to sealing, in which lead terminals are provided on one of the base plates for connection at both ends.

On the base plate 1, a display electrode 3 and lead terminals 4 are formed. On the lead terminals 4, protective layers 10 of a conductive material composed of conductive particles and a binder, are formed. On the back base plate 2, counter electrodes 5 and sealing materials 6 are provided. The protective layers 10 are located so that they overlap partially with the sealing materials 6 and they completely cover the lead terminals.

The protective layers and/or the sealing materials are readily applied by a printing method, particularly by a screen printing method, and they may preliminarily hardened as the case requires.

Figure 5:
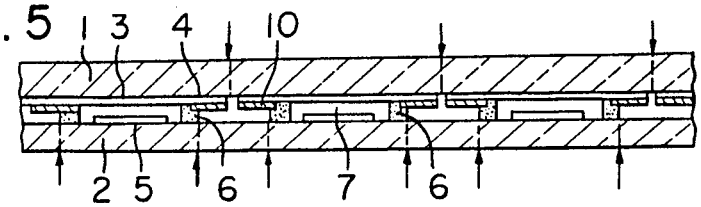

Then, the base plates are pressed against each other under heating or radiated by e.g. ultraviolet rays, whereupon they are formed into cells as shown in FIG. 5. At the overlapping portions of the protective layers 10 and the sealing materials 6, at least one of them is crushed to bond to each other.

Then, the assembly is cut along the lines indicated by arrows in FIG. 5 into individual cells. The injection of a liquid crystal substance and the sealing of the injection inlet may be carried out either prior to or after the cutting operation.

In this embodiment, only three cells are illustrated. However, a greater number of cells may simultaneously be produced by extending the cell-forming structure to the left and right, or to the front and back in the Figure. In the illustrated embodiment, one of the base plates constitutes only a front base plate and the other base plate constitutes only a back base plate. In this case, a number of waste chips will be formed on the back base plate side, but there is a merit that the conductive substance can be printed only on the front base plate side. Whereas, it is possible to form the front base plates and the back base plates alternately for every adjacent cell on the respective base plates so as to avoid the formation of such waste chips. However, in this case, it will be necessary to print the conductive substance on both base plates, thus involving two printing steps, and a care must be taken to avoid the possible contact of the opposing protective layers of conductive material on the lead terminals at the time of the sealing operation. Taking into accounts the mertis and demerits, a decision may be made which one of the arrangement should be employed.

EXAMPLE

In the manner as shown in FIG. 4, a conductive paste (i.e. "Everyohm 101P" manufactured by Nippon Kokuen Kogyo K.K.) composed of carbon particles and a phenol resin was screen-printed on a front base plate in a thickness of $5\mu$ so that it would be embedded in a sealing material for 0.2 mm upon sealing, and then dried at 110° C. for 10 minutes.

On the other hand, a sealing material of an epoxy resin was screen-printed on a back base plate. Both base plates were assembled so that the respective transparent electrodes are face to face, and pressed against each other to have a distance of $10\mu$ from each other and then heated to harden the sealing material and the conductive material. Then, liquid crystal was injected from an injection inlet provided at a side of each cell, and the injection inlet was then sealed with an epoxy resin. Then, the assembly was cut into individual cells. Thus, liquid crystal display devices as shown in FIG. 3 were obtained.

The liquid crystal display devices thus prepared were subjected to a high temperature and high humidity operation test in an atmosphere at 60° C. under a relative humidity of 90% by applying an alternate current voltage of 6 V and 64 Hz, whereby no change was observed even upon expiration of 1000 hours.

COMPARATIVE EXAMPLE 1

Liquid crystal display devices were prepared and a high temperature and high humidity operation test conducted in the same manner as in the Example except that the carbon paste was not used. Corrosion was formed on the lead terminals of one of the ten devices tested upon expiration of 144 hours.

COMPARATIVE EXAMPLE 2

In the same manner as in the Example, liquid crystal display devices were prepared except that the carbon paste was printed on the lead terminals only on the external side of the sealing materials so that it was not embedded in the sealing materials, and a high temperature and high humidity test was carried out. Corrosion was formed on the lead terminals, at the junction with the sealing materials and the carbon paste layer, of one of the ten devices tested upon expiration of 192 hours.

We claim:

1. A highly reliable electrooptical device comprising a pair of electrode plates facing each other with a space and sealed along their periphery by a sealing material to form a cell and an electrooptical material sealed in the cell, characterized in that a protective layer of an electrically conductive material comprising electrically conductive particles and a binder is coated on each lead terminal extending outside the sealing material and the protective layer is partially embedded in the sealing material.

2. The highly reliable electrooptical device according to claim 1 wherein the protective layer of the electrically conductive material is embedded in the sealing material to an extent of not more than 50% of the width of the sealing material.

3. The highly reliable electrooptical device according to claim 1 wherein the electrically conductive particles are carbon particles.

4. The highly reliable electrooptical device according to claim 1 which is a highly reliable liquid crystal display device wherein said electrooptical material is liquid crystal.

5. A process for manufacturing a highly reliable electrooptical device comprising:
 (a) a step of printing an electrically conductive paste comprising electrically conductive particles and a binder on a lead terminal of one of a pair of base plates with an electrode and the lead terminal,
 (b) a step of printing a sealing material on a predetermined position of the other base plate with an electrode,
 (c) a step of assemblying and pressing the two base plates to form a cell, and
 (d) a step of sealing an electrooptical material in a cell gap, wherein said electrically conductive paste and said sealing material are printed in a relative positional relationship such that when the cell is formed, said electrically conductive paste is partially embedded in said sealing material.

6. The process for manufacturing a highly reliable electrooptical device according to claim 5 wherein the electrically conductive particles are carbon particles.

7. The process for manufacturing a highly reliable electrooptical device according to claim 5 wherein the step of assemblying and pressing the two base plates is carried out before the electrically conductive paste is completely hardened.

8. The process for manufacturing a highly reliable liquid crystal display device according to claim 5 wherein said electrooptical material is a liquid crystal.

* * * * *